(12) United States Patent
Xu

(10) Patent No.: US 9,371,039 B2
(45) Date of Patent: Jun. 21, 2016

(54) STORAGE ASSEMBLY WITH DEPLOYABLE LAYER

(71) Applicant: FORD GLOBAL TECHNOLOGIES, LLC, Dearborn, MI (US)

(72) Inventor: Tom Xu, Nanjing (CN)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/798,528

(22) Filed: Jul. 14, 2015

(65) Prior Publication Data

US 2016/0052455 A1 Feb. 25, 2016

(30) Foreign Application Priority Data

Aug. 21, 2014 (CN) .......................... 2014 1 0416093

(51) Int. Cl.
*B60R 7/04* (2006.01)
*B60N 2/46* (2006.01)

(52) U.S. Cl.
CPC .............. *B60R 7/04* (2013.01); *B60N 2/4686* (2013.01)

(58) Field of Classification Search
CPC .......... B60R 7/04; B60R 7/043; B60R 7/046; B60N 2/4686
USPC ........ 296/24.34, 24.46, 37.8, 37.13; 224/275, 224/485
See application file for complete search history.

(56) References Cited

U.S. PATENT DOCUMENTS

| 7,455,016 B2 * | 11/2008 | Perin ...................... B43L 3/008 108/44 |
| 8,011,710 B2 | 9/2011 | Stueber |
| 8,276,964 B2 | 10/2012 | Werner, et al. |

FOREIGN PATENT DOCUMENTS

| DE | 202004011589 | 12/2005 |
| FR | 2991929 | 12/2013 |
| WO | 0021793 | 4/2000 |

OTHER PUBLICATIONS

Console Vault Truck and SUV Console Safe, www.pickupspecialties.com, 13 pages, Sep. 20, 2015.

* cited by examiner

*Primary Examiner* — Jason S Daniels
(74) *Attorney, Agent, or Firm* — Gregory P. Brown; Law Firm of Dr. Junqi Hang, PLC

(57) ABSTRACT

The present invention in one or more embodiments provides a storage assembly, which includes a housing, a tray positioned within the housing and including first and second portions opposing each other, and a track unit supported on the housing including first and second segments to respectively support and guide movement of the first and second portions, the first and second segments being positioned relative to each other with a transverse angle.

17 Claims, 4 Drawing Sheets

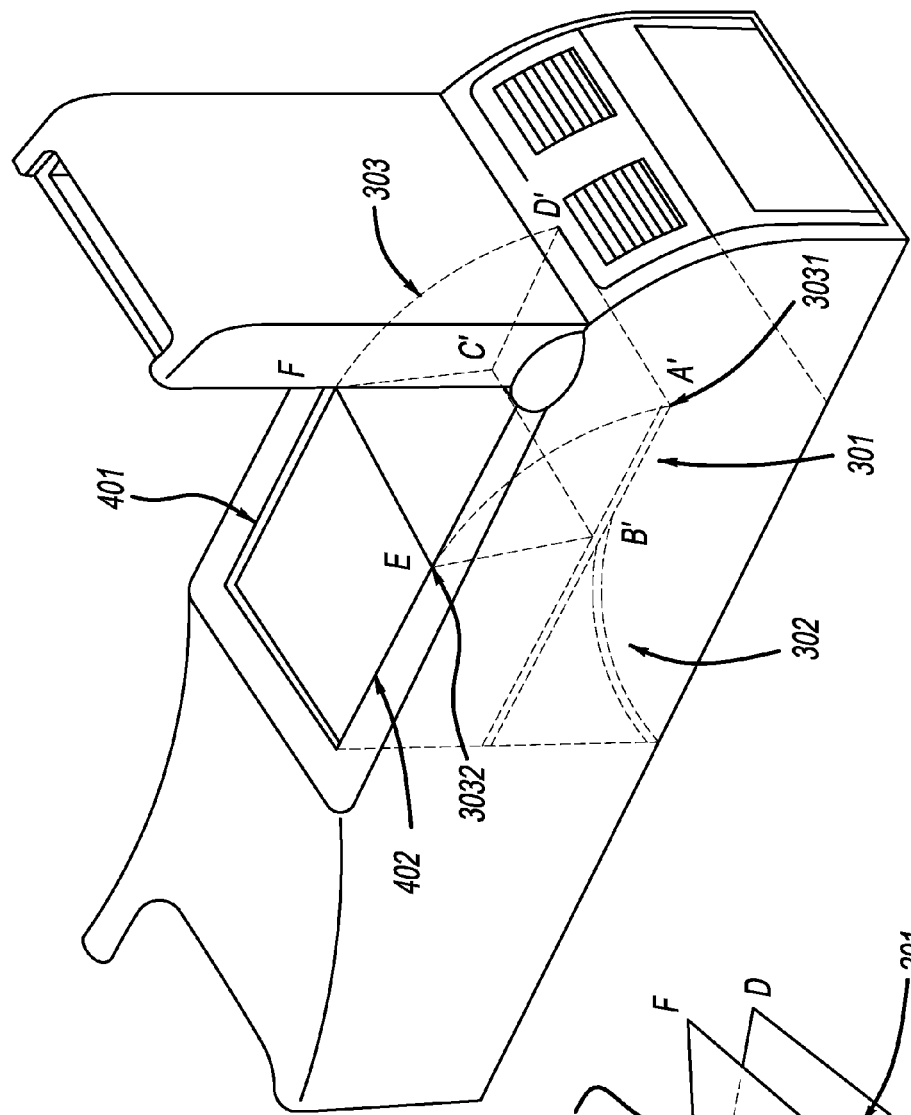
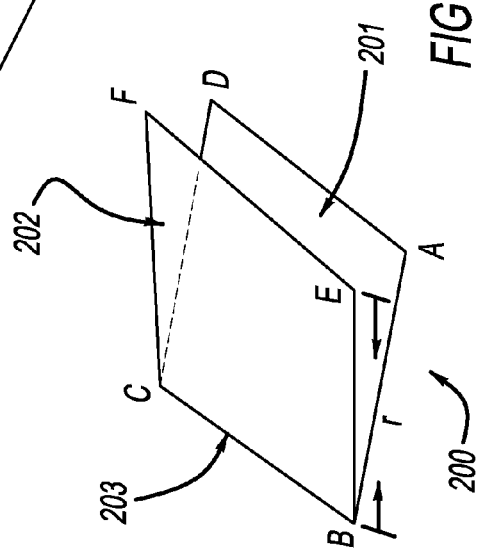

STORAGE ASSEMBLY WITH DEPLOYABLE LAYER

RELATED APPLICATION(S)

This application claims the benefit of Chinese New Invention Patent Application No.: CN201410416093.6, filed on Aug. 21, 2014, the entire contents thereof being incorporated herein by reference.

TECHNICAL FIELD

The present invention relates to a storage assembly with one or more deployable layers, and particularly a vehicle central console with deployable layers.

BACKGROUND

For relatively large storage space, a user may desire to section up the space into smaller compartments for easy access and storage of smaller items. The user may also desire to have the large space back when needed. In the case of vehicle central console or glove box, it is often desirable to be provided with ample storage space at these locations. However issues may arise when the to-be-stored items are small in dimensions and often not readily locatable once stored inside. These small items include keys, mobile phones, coins and receipts.

Some existing designs exist to section smaller compartments out from a relatively larger space. For instance, U.S. Pat. No. 8,011,710B2 discloses a foldable panel, where the panel requires at least two hinges for connection and rotation. This disclosed structure may be complex and costly to build. In addition, usable space may be reduced because the panel needs to be folded down for storage when not in use. Furthermore, and even though the space may be segmented via the hinges, the smaller items may still move with no restriction and therefore unnecessary noises may result.

SUMMARY

In one or more embodiments, a storage assembly includes a housing, a tray positioned within the housing and including first and second portions opposing each other, and a track unit supported on the housing and including first and second segments to respectively support and guide movement of the first and second portions, the first and second segments being positioned relative to each other with a transverse angle.

The transverse angle may be greater than zero and smaller than 90 degrees. At least one of the first and second segments may be supported on a wall of the housing. At least one of the first and second segments may be part of the wall in the form of a recessed channel. At least one of the first and second portions may include a protrusion to be received within the recessed channel. The first segment may be straighter than the second segment. The first portion and the second portion may be pivotally connected. The track unit may further include a third segment for supporting and guiding the second portion's pivoting about the first portion.

One or more advantageous features as described herein are believed to be readily apparent from the following detailed description of one or more embodiments when taken in connection with the accompanying drawings.

BRIEF DESCRIPTION OF THE DRAWINGS

Reference is now made to the one or more embodiments illustrated in greater detail in the accompanying drawings and described below wherein:

FIG. 2 illustratively depicts a console tray referenced in FIG. 1, where the console tray is at a deployed position;

FIG. 3 illustratively depicts a panel structure of the central console referenced in FIG. 2;

DETAILED DESCRIPTION OF ONE OR MORE EMBODIMENTS

Figure 1:
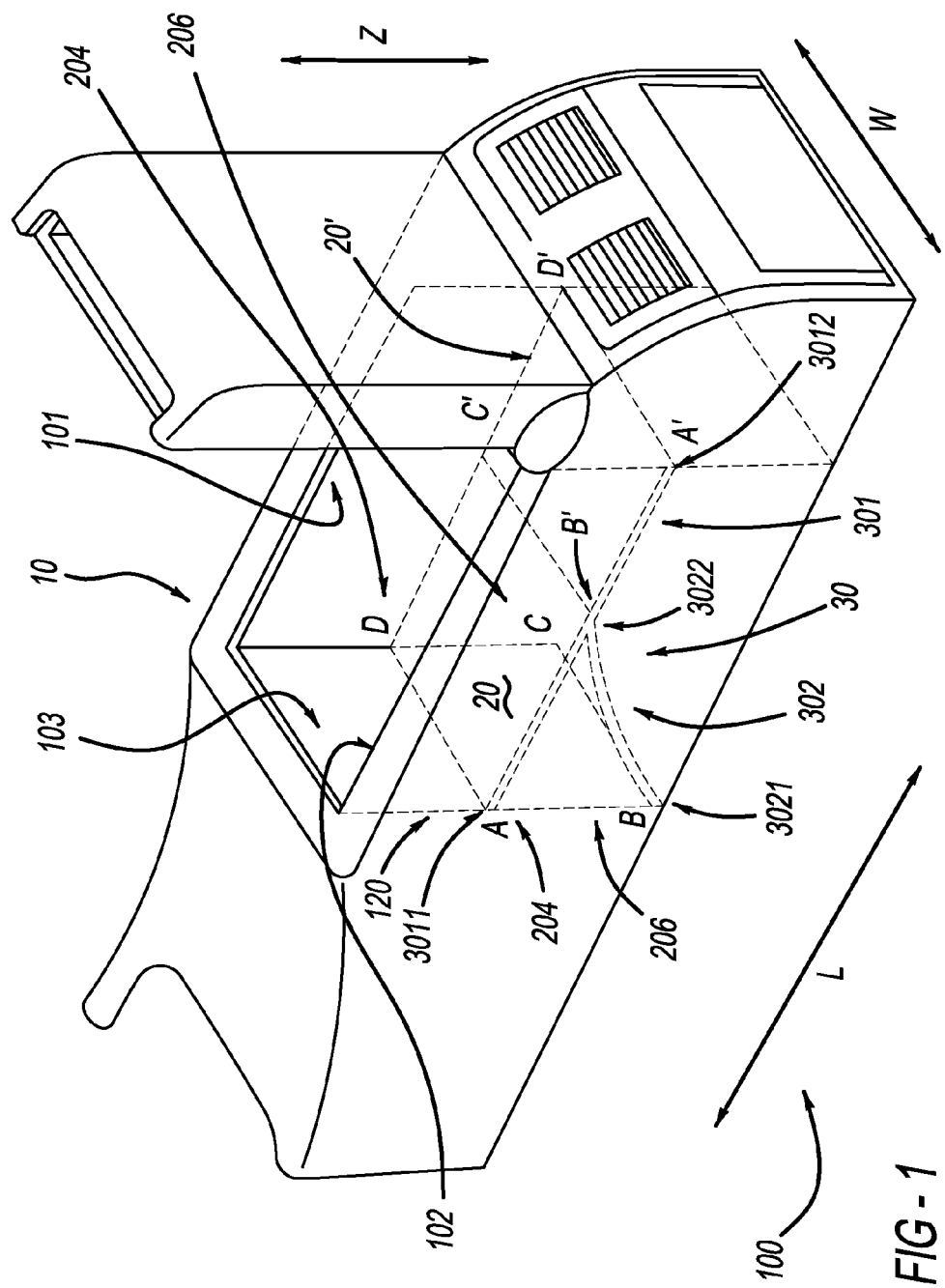
FIG. 1 illustratively depicts a vehicle console assembly according to one or more embodiments.

As referenced in the FIGs. the same reference numerals may be used herein to refer to the same parameters and components or their similar modifications and alternatives. These parameters and components are included as examples and are not meant to be limiting. The drawings referenced herein are schematic and associated views thereof are not necessarily drawn to scale.

Without wanting to be limited to any particular theory, the present invention in one or more embodiments is advantageous in providing a storage assembly with retractable divisions wherein storage space with variable size and optionally variable depth may be made available on an as-needed basis.

As illustratively depicted in FIG. 1, a storage assembly generally shown at 100 may take the configuration or form of a vehicle central console or any other suitable configurations or forms such as a vehicle glove box, a vehicle luggage compartment or any independent storage containers. The storage assembly 100 includes a storage space defined by a storage housing 10. The storage housing 10 may take the form of a cube or any other suitable shapes, and includes at least one wall or side wall 101. Referring back to FIG. 1, the housing 10 includes a pair of opposing walls 101 and 102, and a track 30 is positioned on the wall 102 and includes at least two segments, a first segment 301 and a second segment 302.

In certain embodiments, the first and second segments 301, 302 are similarly positioned on both the first and second wall 101, 102 such that a tray or a storage tray 20 may be supported and guided for movement relatively more stably on the track 30 via both the first wall 101 and the second wall 102. However, in the event that the storage tray 20 is sturdy or rigid enough, the storage tray 20 may be supported by the track 30 positioned on only one side of the housing 10, such as the first wall 101 or the second wall 102.

Referring back to FIG. 1, the first segment 301 is illustratively depicted as a relatively straight channel or path extending in a longitudinal direction L; the second segment 302 is illustratively depicted as a relatively curved channel or path extending in a direction as a function of the longitudinal direction L and a depth direction Z. The term "relatively straight" may refer to the configuration where a linear distance between the two end points of the first segment 301 is within 20 percent plus and minus of a perimeter along the first segment 301 from one of the end points to the other. Similarly, the term "relatively curved" may refer to the configuration where a linear distance between the two end points of the second segment 302 is 20 percent plus and minus outside of a perimeter along the second segment 301 from one of the end points to the other. Alternatively, the second segment 302 is more curved than the first segment 301 when a difference between the linear distance and the perimeter between the two end points of the second segment 302 is greater than that of the first segment 301.

Figure 4:
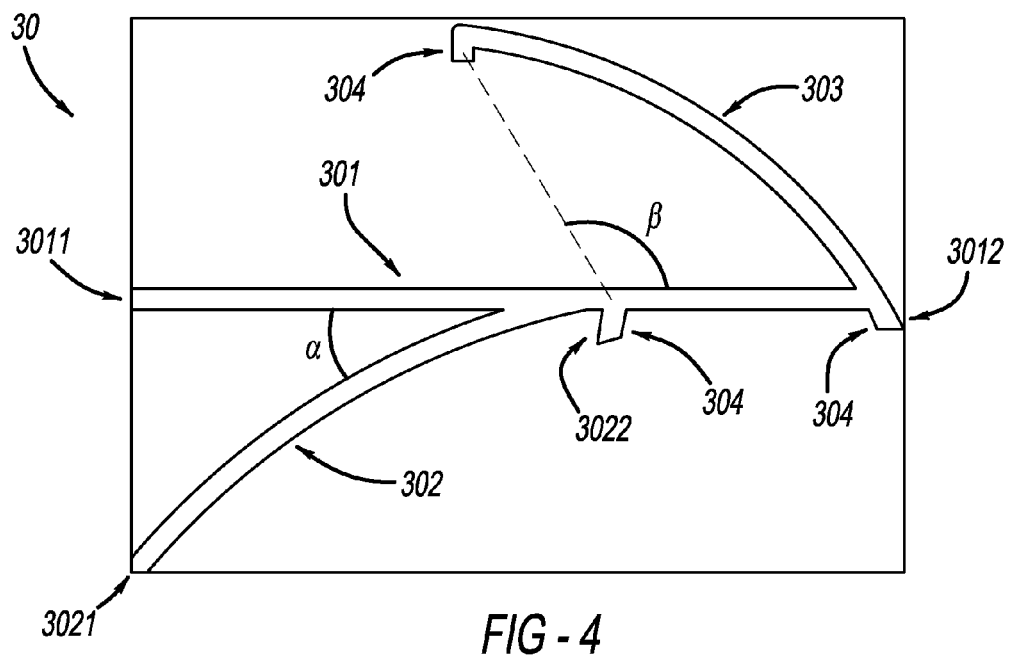
FIG. 4 illustratively depicts a track formed on a side wall of the central console referenced in FIG. 1.

Referring to FIG. 4, the first segment 301 may be positioned to the second segment 302 with a transverse angle α, the angle formed between a linear line defined by the two end points 3011, 3012 and a linear line defined by the two end points 3021, 3022. The angle α is a value greater than zero and smaller than 90 degrees.

Referring back to FIG. 1, the tray 20 includes a first portion 204 and a second portion 206. The first portion 204 includes the corners A and D and extends therefrom with any suitable area toward the second portion 206. The second portion 206 includes the corners B and C and extends therefrom with any suitable area toward the first portion 204. The first portion 204, and particularly the corner A and/or the corner D, is supported on and moves along the first segment 301. The second portion 206, and particularly the corner B and/or the corner C thereof, are supported on and move along the second segment 302.

One end 3011 of the first segment 301 and an end 3021 of the second segment 302 together form a starting position of the tray 20. When the corners A and B of the tray 20 are positioned respectively at the end 3011 of the first segment 301 and the end 3021 of the second segment 302, the tray 20 is next to a third wall 103 intermediate between the first and second walls 101, 102, and at a retracted position, as illustratively shown at an area defined by ABCD. Optionally the end 3011 and/or the end 3021 may not rest upon the third wall 103. In these instances, the storage tray 20 may be spaced apart from the third wall 103 at a rest position. The spacing apart may be realized at the portion including the corners A and D, or at the portion including the corners B and C, or both. One benefit of this spaced apart design is that the storage tray 20 may be easily located by a quick touch via a user's hand without any visual inspection. This may be particularly useful as the user is concurrently driving.

Referring back to FIG. 1, the end 3011 and the end 3021 may be positioned on the third wall 103 and therefore also at the intersecting line 120 between the second wall 102 and the third wall 103. In these instances, a distance between the ends 3011 and 3021 should equal to the length of the side AB of the storage tray 20. The same or similar construction may be applied to the first wall 101 relative to the third wall 103.

When the corners A and B of the tray 20 respectively move together along the first segment 301 from the end 3011 to the end 3012 and along the second segment 302 from the end 3021 to the end 3022, the tray 20 reaches its deployed position while being substantially horizontal, such as at a position or an area represented with A'B'C'D', where the storage housing 10 is divided into two compartments, one upper and one lower.

The end 3011 of the first segment 301 and the end 3021 of the second segment 302 together do not necessarily define a perpendicular relationship relative to a horizontal edge or the longitudinal direction L of the housing 10. The relative position may rather be adjusted according to the shape of the third wall 103. For instance, and if the third wall 103 is tilted, the end 3011 of the first segment 301 and the end 3021 of the second segment 302 may also be suitably tilted such that the tray 20 may be positioned in the closest proximity to the third wall 103 to avoid unnecessary space consumption at a retracted position.

In addition, the end 3012 of the first segment 301 and the end 3022 of the second segment 302 together do not necessarily form a substantially horizontal relationship relative to direction L or direction W, and rather may be of any suitable positional relationship dependent upon the storage need at hand. For instance, a storage space of a triangular shape may be desired for items such as mobile phones or magazines. To form such a storage space, the end 3012 of the first segment 301 may be positioned to be lower than the end 3022 of the second segment 302 along direction Z such that the tray 20 may be tilted and provided with an angle at a deployed position.

Furthermore, in the event that the track 30 is an attachment to the first and/or second wall 101, 102 such that the track 30 may itself move as needed, the start and/or end positions of the storage tray 20 may also change as needed. For instance, when and as necessary the ends 3011, 3021 move up or down along the depth direction Z, the end position of the storage tray 20 may subsequently vary along the depth direction Z within the housing 10. Accordingly the internal space within the housing 10 may be divided in depth as needed to accommodate particular storage needs at hand.

Alternatively, and when the track 30 is not relatively movable along the depth direction Z such as when the track 30 is built integral to the first and/or second wall 101, 102, one or more duplicate tracks (not shown) similar to the track 30 may be employed to accommodate storage needs at different depth levels.

In certain embodiments, the tray 20 may itself be with any suitable variations. For instance, and as illustratively depicted in FIG. 2 and FIG. 3, the tray 20 includes a main panel 201 and a deployable panel 202 connected via a shaft 203 to the main panel 201. Particularly, the corners B and C are positioned between the main panel 201 and the deployable panel 202. At a retracted position, the main panel 201 and the deployable panel 202 are in close proximity to the third wall 103. The main panel 201 and the deployable panel 202 may stay close to each other when moving from a retraced position to a deployed position along the track 30.

Referring back to FIG. 2, the track 30 may further include a third segment 303 configured in a circular shape and/or a shape with an arc, where an end 3031 is positioned on the first segment 301 to be in proximity to the end 3012 or to merge with the end 3012, and where another end 3032 is positioned upward of the first segment 301 along direction Z. The third segment 303 is in alignment with at least a portion of the circumference of a circle of which the radius is the width r of the tray 202. The tray 202 may rotate about the shaft 203 when having arrived at its horizontal position or a deployed position, where its corners E or F may move along the third segment 303 of the track 30, such that the deployable panel 202 of the tray 20 may deploy a bit further to form a compartment with the main panel 201. In this configuration, the deployable panel 202 may function as a side wall of the newly formed compartment to prevent stored items from falling off the main panel 201. To keep the deployable panel 202 at its fully deployed position, an angle β of the deployable panel 202 relative to the main panel 201 is no less than 90 degrees.

Alternatively, the corner E and/or the corner F may be provided with one or more connectors to secure a relatively upright position of the deployable panel 202. The one or more connectors may be of any suitable structures including latches, springs, and hooks. The one or more connectors may secure the positioning of the side panel 202 relative to the first wall 101, the second wall 102, and/or top edges 401, 402 thereof. With the one or more connectors, the third segment 303 may not be needed.

FIG. 4 illustratively depicts the track 30 as positioned on the first wall 101 and/or the second wall 102. In this configuration, the second segment 302 is more curved and the first segment 301 is relatively straighter. Accordingly the second segment 302 is more curved or less straight than the first segment 301. The end 3022 of the second segment 302 is positioned on the first segment 301, or the second segment 302 and the first segment 301 are connected at the end 3022 of the second segment 302.

A locking device may be employed to further limit movement of the tray 20 when the tray is already at the deployed position. In certain embodiments, the locking device may be a recess or cavity 304 on the track 30. When the tray 20 moves to reach the recess 304, its corners A and/or B may be received within the recess 304, to limit translational movement of the tray 20 such that the tray 20 may be positioned at this given location. The locking device may be of any suitable forms such as buckles, clips and magnetic connections.

As mentioned herein elsewhere, the track 30 may be of any suitable configurations. For instance, the track 30 may be a recess or protrusion integral to a wall of the housing 10, a path or trail positioned on such recess or protrusion, or a path or trail connected to the wall via adhesives or other suitable connection methods. One or more pulleys may be provided at the ends ABCD to be received at the track to guide the movement of the tray 20.

Figure 5:
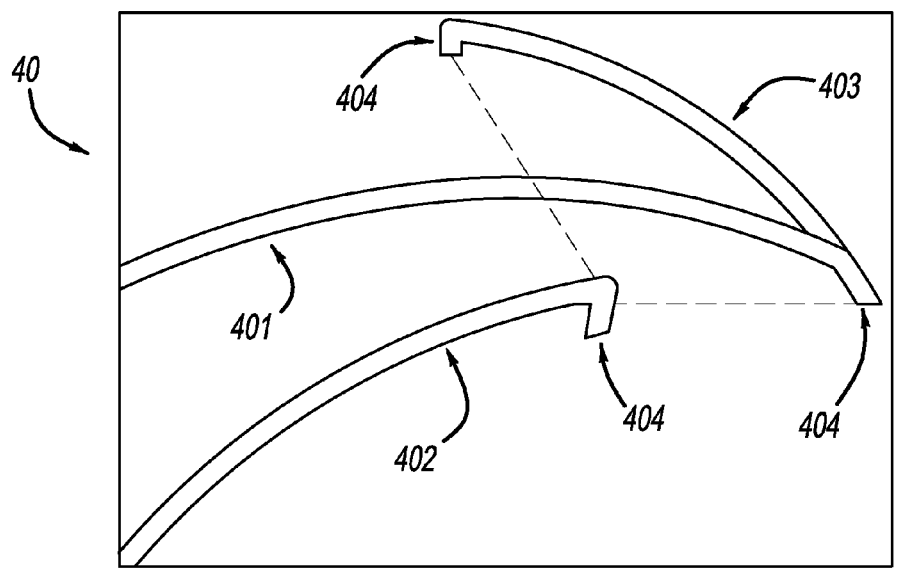
FIG. 5 illustratively depicts a cross-sectional view of a variation to the track referenced in FIG. 1.

FIG. 5 illustratively depicts a track 40 positioned on the wall 101 and/or the wall 102, as an alternative to the track 30. In this configuration, the track 40 includes a first segment 401 which is curved and a second segment 402 which is also curved, respectively to provide for the corners A and B a retracted position, a deployed position and a movement trail. The first segment 401 and the second segment 402 are not necessarily connected. In certain embodiments, the first segment 401 which provide support to end A of the tray 20 at a relatively upper position may be more curved or with a greater curvature than the second segment 402 which provides support for the end B at a relatively lower position. In certain other embodiments, the first segment 401 supporting the corner A at a relatively upper position provides a relatively longer horizontal movement distance than the second segment 402 supporting the corner B at a relatively lower position. A third segment 403 may further be employed to provide movement path and support, and to position the tray 20 at a predetermined location via a locking device 404.

Figure 6:
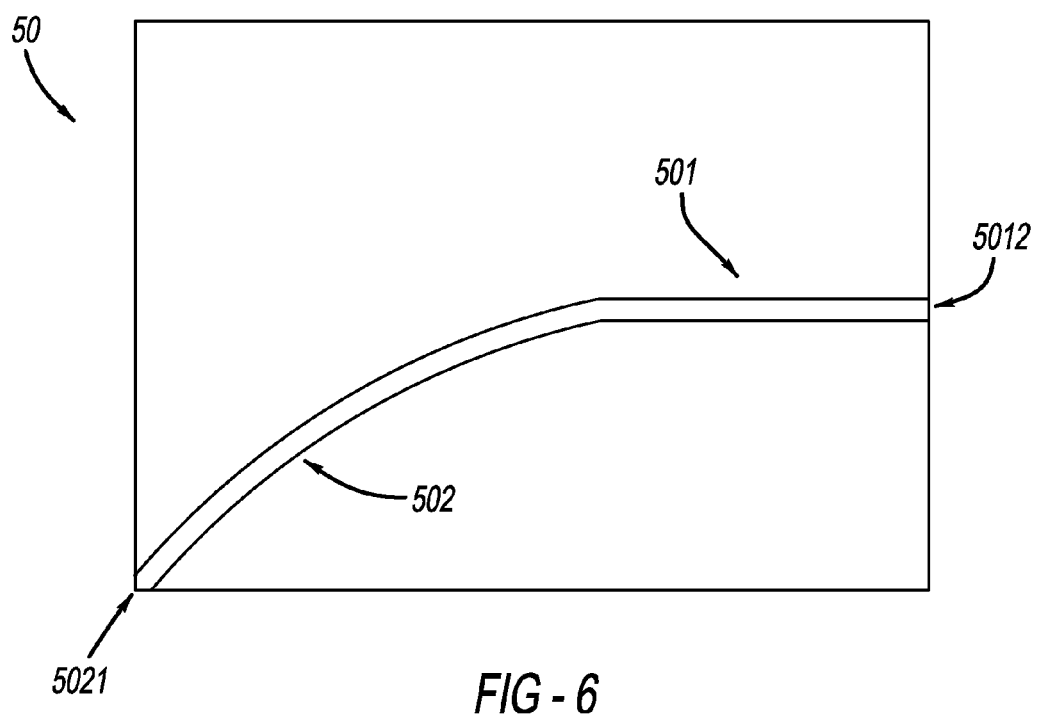
FIG. 6 illustratively depicts a cross-sectional view of another variation of the track of the central console referenced in FIG. 1.

FIG. 6 illustratively depicts a track 50 to be positioned in the side wall 101 and/or the side wall 102, as an alternative design to the track 30. In this configuration, the track 50 includes a first segment 501 which is comparatively straighter, and a second segment 502 that is comparatively curvier. However, an end of the second segment 502 is connected to the first segment 501, so as to form a track with partial curviness yet no branches. In this configuration, the corners B and C of the tray 20 may move from end 5021 of the track 502 to the first segment 501 and eventually end and be stabilized at end 5012. The top corners A and D may contact the third wall 103 at the retracted position and move to a deployable position, or move along the track 501 to reach the deployable position. In the configuration illustratively depicted in FIG. 4 and FIG. 5, a third segment that is optionally curvy may be employed to provide additional support and path-guiding for the deployable layers, and a locking device may also be provided to stabilize the deployable layer at a given position. Moreover, and as illustratively depicted in FIG. 4 and FIG. 5, the end point 5021 does not necessarily have to be connected to the third wall 103. In other words, the end 5021 may be spaced apart from the third wall 103. Similarly, the end 5012 may also be spaced apart from its adjacent side wall (not shown).

To accommodate for certain rigidity or inflexibility of the track 30, and to facilitate a relatively smooth transitional movement from a start position to an end position, the storage tray 20 may be of a bendable construction, and/or be formed of a flexible material such as fabrics, leather, plastics, and soft polymers such as rubbers and rubbery nets. In addition, the framing of the storage tray 20 may also be flexible and bendable. Non-limiting examples of the framing for the storage stray 20 include bendable plastics, leather, and durable fabrics.

In one or more embodiments, the present invention as set forth herein is believed to have overcome certain challenges associated with vehicle storage. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A storage assembly comprising:
   a housing;
   a tray positioned within the housing and including main and deployable panels; and
   a track unit supported on the housing and including first and second segments to respectively support first and second portions of the main panel and being positioned relative to each other with a transverse angle, the track unit further including a third segment to support the deployable panel's pivoting about the main panel.

2. The storage assembly of claim 1, wherein the transverse angle is greater than zero and smaller than 90 degrees.

3. The storage assembly of claim 1, wherein at least one of the first and second segments is supported on a wall of the housing.

4. The storage assembly of claim 3, wherein at least one of the first and second segments is part of the wall in the form of a recessed channel.

5. The storage assembly of claim 4, wherein at least one of the first and second portions includes a protrusion to be received within the recessed channel.

6. The storage assembly of claim 1, wherein the first segment is straighter than the second segment.

7. The storage assembly of claim 1, further comprising a locking device to stabilize the second portion as positioned relative to the first portion.

8. The storage assembly of claim 1, wherein the third segment is positioned on a wall of the housing.

9. The storage assembly of claim 1, wherein the first segment is spaced apart from the second segment.

10. The storage assembly of claim 1, wherein the first segment is connected to the second segment.

11. A storage console of a vehicle, comprising:
    a housing;
    a console cover to cover at least a portion of the housing;
    a tray positioned within the housing and including main and deployable panels pivotally connected to each other at a first end of the main panel; and
    a track unit supported on the housing and including first and second segments to respectively support the first end and a second end of the main panel, the first and second segments being positioned relative to each other with a transverse angle.

12. The storage console of claim 11, wherein the track unit further includes a third segment to support and guide the deployable panel's pivoting about the second portion.

13. The storage console of claim 11 further comprising a locking device to stabilize the tray at a deployed position.

14. The storage console of claim 11, wherein the first segment contacts the second segment at a first end positioned between anterior and posterior ends of the housing along a longitudinal direction.

15. The storage console of claim 14, wherein the track unit further includes a third segment which contacts the second segment at a second end and includes a third end opposing the second end, the first end being positioned between the third end and the second end along the longitudinal direction.

16. The storage console of claim 14, where a first angle between the first and second segments is different from a second angle between the third and second segments.

17. A storage assembly comprising:
   a housing;
   a tray positioned within the housing and including first and second portions opposing each other; and
   a track unit supported on the housing and including first and second segments to respectively support and guide movement of the first and second portions, the first and second segments being positioned relative to each other with a transverse angle, wherein the first segment contacts the second segment at a first end positioned between anterior and posterior ends of the housing along a longitudinal direction, and wherein the track unit further includes a third segment which contacts the second segment at a second end and includes a third end opposing the second end, the first end being positioned between the third end and the second end along the longitudinal direction.

* * * * *